United States Patent
Wang et al.

(10) Patent No.: US 12,075,412 B2
(45) Date of Patent: Aug. 27, 2024

(54) RESOURCE CONFIGURATION FOR SIDELINK COMMUNICATION

(71) Applicant: ZTE Corporation, Guangdong (CN)

(72) Inventors: Mengzhen Wang, Guangdong (CN); Lin Chen, Guangdong (CN)

(73) Assignee: ZTE Corporation, Shenzhen (CN)

( * ) Notice: Subject to any disclaimer, the term of this patent is extended or adjusted under 35 U.S.C. 154(b) by 283 days.

(21) Appl. No.: 17/401,058

(22) Filed: Aug. 12, 2021

(65) Prior Publication Data
US 2022/0022228 A1    Jan. 20, 2022

Related U.S. Application Data

(63) Continuation of application No. PCT/CN2019/074951, filed on Feb. 13, 2019.

(51) Int. Cl.
*H04W 72/12* (2023.01)
*H04W 4/46* (2018.01)
*H04W 72/20* (2023.01)
*H04W 76/14* (2018.01)

(52) U.S. Cl.
CPC ............ *H04W 72/20* (2023.01); *H04W 4/46* (2018.02); *H04W 76/14* (2018.02)

(58) Field of Classification Search
CPC ... H04W 72/1278; H04W 72/40; H04W 4/46; H04W 76/14; H04W 72/20
See application file for complete search history.

(56) References Cited

U.S. PATENT DOCUMENTS

| | | | |
|---|---|---|---|
| 10,687,334 B2 | 6/2020 | Yoon | |
| 10,863,574 B2 | 12/2020 | Byun et al. | |
| 2019/0037448 A1* | 1/2019 | Shan | H04W 60/04 |
| 2022/0070826 A1* | 3/2022 | Xu | H04W 72/20 |
| 2022/0086935 A1* | 3/2022 | Byun | H04W 72/04 |

FOREIGN PATENT DOCUMENTS

| | | |
|---|---|---|
| CN | 109076627 A | 12/2018 |
| CN | 109246747 A | 1/2019 |
| KR | 20180036476 A | 4/2018 |

OTHER PUBLICATIONS

LG Electronics, Inc., "Summary of Offline Discussion: WF for "Study on NR V2X" in RAN3," 3GPP TSG-RAN WG3 Meeting #101bis, R3-186225, Chengdu, China, Oct. 8-12, 2018, 1 page.
European Search Report for EP Patent Application No. 19915282.8, dated Jul. 11, 2022, 14 pages.

(Continued)

*Primary Examiner* — Derrick V Rose
(74) *Attorney, Agent, or Firm* — Perkins Coie LLP

(57) ABSTRACT

The disclosed techniques enable resource configuration for sidelink communications. An example method includes receiving, by a first network element, a sidelink resource request transmitted from a communication node. The method also includes communicating, via an interface between the first network element and a second network element, information about resource configuration for the communication node. The method further includes transmitting, by the first network element, a response to the sidelink resource request.

20 Claims, 11 Drawing Sheets

(56) References Cited

OTHER PUBLICATIONS

Qualcomm Incorporated, "Design aspects and requirements for QoS," 3GPP TSG RAN WG1 Meeting #95, R1-1813427, Spokane, USA, Nov. 12-16, 2018, 6 pages.
3rd Generation Partnership Project; Technical Specification Group Services and System Aspects; Architecture enhancements for V2X services (Release 15), 3GPP TS 23.285, V15.2.0, (Dec. 2018), 37 pages.
Huawei, "Support for Advanced V2X Use Cases," 3GPP TSG-RAN3 Meeting #101-bis, R3-185716, Chengdu, China, Oct. 8-12, 2018, 5 pages.
Huawei et al., "Support of QoS for PC5-based V2X transport," 3GPP TSG-RAN WG2 Meeting #95, R2-164917, Gothenburg, Sweden, Aug. 22-26, 2016, 6 pages.
3rd Generation Partnership Project; Technical Specification Group Radio Access Network; NG-RAN; F1 application protocol (F1AP), (Release 15), 3GPP TS 38.473, V15.3.0, (Sep. 2018), 176 pages.
3rd Generation Partnership Project; Technical Specification Group Services and System Aspects; Study on architecture enhancements for EPS and 5G System to support advanced V2X services (Release 16), 3GPP TR 23.786, V1.1.0, (Jan. 2019), 111 pages.
LG Electronics Inc., "Issues of F1 interface to support NR sidelink resource allocation mode 1 and mode 2," 3GPP TSG-RAN WG3 Meeting #102, R3-186353, Spokane, USA, Nov. 12-16, 2018, 3 pages.
Huawei, "F1 signalling for SL resources," 3GPP TSG-RAN3 Meeting #102, Spokane U.S.A., R3-186427, 4 pages, Nov. 12-16, 2018.
International Search Report and Written Opinion dated Nov. 4, 2019 for International Application No. PCT/CN2019/074951, filed on Feb. 13, 2019 (7 pages).
NTT Docomo, Inc. "High level overview of functions for LTE higher layer split," 3GPP TSG-RAN WG3 RAN3 #102, Spokane, WA, U.S.A., R3-186613, 11 pages, Nov. 12-16, 2018.
Korean office action issued in KR Patent Application No. 10-2021-7028726, dated Jun. 25, 2024, 7 pages. English translation included.
3GPP TS 38.473, V15.4.0, (Dec. 2018), Technical Specification, 3rd Generation Partnership Project; Technical Specification Group Radio Access Network; NG-RAN; F1 application protocol (F1AP), (Release 15), 192 pages.
CATT, "Discussion on NR eV2X," 3GPP TSG RAN WG3 Meeting #102, R3-186370, Spokane, Washington, USA, Nov. 12-16, 2018, 4 pages.
Qualcomm Incorporated, "Key Issue #3 QoS Support for eV2X over Uu interface conclusions," SA WG2 Meeting #130, S2-1900339 (was S2-19xxxxx), Kochi, India, Jan. 21-25, 2019, 5 pages.

\* cited by examiner

RESOURCE CONFIGURATION FOR SIDELINK COMMUNICATION

CROSS-REFERENCE TO RELATED APPLICATIONS

This application is a continuation of and claims priority to International Patent Application No. PCT/CN2019/074951, filed on Feb. 13, 2019, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed to enable resource configuration for vehicle to everything (V2X) communication. In one example aspect, a method of wireless communication is disclosed. The method includes, receiving, by a first network element, a sidelink resource request transmitted from a user equipment (UE), and communicating, via an interface between the first network element and a second network element, information about resource configuration for the UE. The method also includes transmitting, by the first network element, a response to the sidelink resource request.

In some embodiments, the first network element is a gNB-DU and the second network element is a gNB-CU. In some embodiments, the sidelink resource request includes at least one of a service type, target address, destination identity, frequency of interest, subcarrier space (SCS), service QoS information, cross-RAT interest indication, or mapping relationship between (a) service type and/or target address and (b) Tx profile and/or traffic pattern corresponding to individual service type, target address, and/or destination identity.

In some embodiments, communicating information about resource configuration for the UE comprises forwarding, by the first network element, the sidelink resource request to the second network element. In some embodiments, the forwarding is performed without decoding of the sidelink resource request by the first network element.

In some embodiments, the method further includes communicating sidelink communication assistance configuration information to the UE, wherein the sidelink communication assistance configuration information is included in V2X SIB In another example aspect, a method for facilitating wireless communication includes receiving, by a first network element, sidelink resource request information transmitted from a second network element, wherein the sidelink resource request information includes information about a user equipment (UE). The method also includes transmitting, from the first network element to the second network element, information indicating sidelink resource configuration for the UE.

In some embodiments, the sidelink resource request information includes at least one of a service type, destination identity, frequency of interest, subcarrier space (SCS), service QoS information, communication type, group leader, group member, group information, cross-RAT interest indication, or mapping relationship between (a) service type and/or destination identity and (b) Tx profile and/or traffic pattern corresponding to individual service type and/or destination identity.

In some embodiments, the sidelink resource request information includes at least one of mode 1 resource scheduling, configured grant type 2 scheduling, configured grant type 2 activation, configured grant type 2 deactivation, configured grant type 2 periodicity, mode 1 resource pool, Modulation and Coding Scheme (mcs), per destination duplication carrier sets, or mapping between (a) LCG and (b) PC5 QoS index, QFI, priority level, and/or reliability level.

In some embodiments, the sidelink resource configuration includes at least one of a configured grant type, configured grant index; sidelink configured scheduling RNTI, periodicity, subcarrier spacing, time domain resource location, frequency domain resource location, mode 1 resource pool, resource pool for autonomous resource selection, resource pool for sidelink reception, exceptional resource pool for sidelink transmission, mapping between a sidelink logical channel and a configured grant index, scheduling request identity, PC5 5G QoS Identifier, PC5 5G QoS index, QoS Flow Identifier, priority, reliability, delay, communication range level, mapping between (a) a sidelink logical channel group identity and (b) a scheduling request identity, PC5 5G QoS Identifier, PC5 5G QoS index, QoS Flow Identifier, priority, reliability, delay, and/or communication range level, mapping between (a) a scheduling request identity and (b) a PC5 5G QoS Identifier, PC5 5G QoS index, QoS Flow Identifier, priority, reliability, delay, and/or communication range level, or an attribute for each configured grant, wherein the attribute includes at least one of a 5QI/PC5 Qos index, priority or ProSe-Per-Packet Priority (PPPP), reliability or ProSe-Per-Packet Reliability (PPPR), delay, Logical Channel Identity (LCID), or Logical Channel Group Identity (LCGID).

In some embodiments, the sidelink resource request information is transmitted using an F1 UE context modification request or an F1 message defined for transmitting UE sidelink information. In some embodiments, the information indicating the sidelink resource configuration is transmitted using an F1 UE context modification response or an F1 message defined for transmitting UE sidelink configuration.

In some embodiments, the method further includes forwarding, from the first network element to the second network element, a sidelink resource request transmitted by the UE. In some embodiments, the forwarding is performed using F1 UL RRC message transfer.

In some embodiments, the second network element generates an RRC reconfiguration message for the UE after receiving the information indicating the sidelink resource configuration. In some embodiments, the second network element transmits the RRC reconfiguration message to the first network element using F1 DL RRC message transfer. In some embodiments, the first network element transmits the RRC reconfiguration message to the UE.

In some embodiments, the method further includes receiving, by the first network element, V2X authorization information regarding the UE, wherein the V2X authorization information is transmitted from the second network element. In some embodiments, the method further includes storing and responding to the V2X authorization information. In some embodiments, the V2X authorization information includes at least one of vehicle UE, pedestrian UE, sidelink discovery authorization, sidelink communication authorization, LTE sidelink communication authorization, NR sidelink communication authorization, sidelink cross-RAT authorization, authorization for NR sidelink unicast/groupcast/broadcast, authorization-supported service type and/or destination L2 ID list, group leader UE, group member UE, automated UE, remote driving UE, or authorization-supported service automation level. In some embodiments, the V2X authorization information is transmitted using an F1 UE context setup/modification request message or another F1 message.

In some embodiments, the method further includes receiving, by the first network element, at least one of PC5 QoS information regarding the UE or CU part sidelink bearer configuration regarding the UE, wherein the at least one of PC5 QoS information or CU part sidelink bearer configuration is transmitted from the second network element. In some embodiments, the method further includes transmitting, from the first network element to the second network element, at least one of sidelink communication assistance configuration or DU part sidelink bearer configuration. In some embodiments, the PC5 QoS information includes at least one of UE PC5 AMBR, per PC5 QoS flow MFBR/GFBR/ARP, or service QoS information.

In some embodiments, the CU part sidelink bearer configuration includes at least one of a mapping between QFI/PC5 QoS index/priority level/reliability level/latency/communication range and SLRB/sidelink logical channel, SCS/maximum PSSCH duration of a SL LCH, whether a SL LCH is allowed to use configured grant type 1/configured grant type 2/mode 1/mode 2, a threshold of duplication, duplication carrier sets of a destination, PDCP SN size, or PDCP t-reordering timer.

In some embodiments, the sidelink communication assistance configuration includes at least one of a mapping between QFI/PC5 QoS index/priority level/reliability level/latency/communication range and maximum PSSCH duration/SCS, a threshold of priority level or latency for using configured grant type 1/type 2/mode 1/mode 2, a threshold of PER or reliability level for using RLC AM and/or PDCP duplication, or a mapping between logical channel group and priority level/reliability level.

In some embodiments, the DU part sidelink bearer configuration includes at least one of an RLC SN size, RLC UM mode, RLC AM mode, polling parameters, or RLC t-reassembly timer. In some embodiments, the at least one of PC5 QoS information or CU part sidelink bearer configuration is transmitted using an F1 UE context setup/modification request message or another F1 message. In some embodiments, the at least one of sidelink communication assistance configuration or DU part sidelink bearer configuration is transmitted using an F1 UE context setup/modification response message or another F1 message.

In some embodiments, the method further includes receiving, by the first network element, V2X sidelink resource pool configuration transmitted from the second network element. In some embodiments, the V2X sidelink resource pool configuration includes at least one of SL BWP, reception resource pools, V2X transmission resource pool, P2X transmission resource pool, unicast/groupcast/broadcast transmission resource pool, exceptional resource pool, inter-frequency resource pools, synchronization configuration, resource selection configuration, zone configuration, threshold for sidelink transmission prioritization, anchor carrier list, CBR configuration, or PDCP duplication configuration. In some embodiments, the V2X sidelink resource pool configuration is transmitted using at least one of encoded V2X SIB, CU to DU RRC container, or other F1 information element.

In some embodiments, the method further includes transmitting, by the first network element, V2X sidelink resource pool configuration to the second network element. In some embodiments, the V2X sidelink resource pool configuration is transmitted using DU to CU RRC container or other F1 information element.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Overview

The Internet of Vehicles (IoV) can generally refer to a large scale network system that enables wireless communication and information exchange between vehicle(s) and everything (X) according to agreed-upon communication protocol(s) and data interaction standard(s). Illustratively, X can be vehicle(s), pedestrian(s), roadside equipment, the Internet, or the like. In this patent document, the term vehicle can include a car, a bicycle, an electric car, a scooter, a boat, an airplane, or a train. Communication through IoV can help vehicles to achieve driving safety, improve traffic efficiency, and access convenience and/or entertainment information. IoV communication can include three different types: vehicle-to-vehicle (V2V) communication, vehicle to infrastructure/vehicle to network (V2I/V2N) communication, and vehicle to pedestrian (V2P) communication, which collectively can be referred to as vehicle to everything (V2X) communication.

Figure 1:
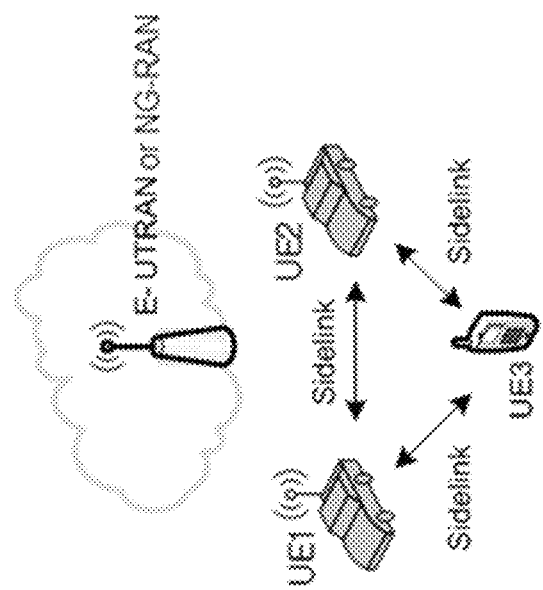
FIG. 1 illustrates an example of V2X communication, in accordance with various embodiments of the presently disclosed technology.

In the LTE-based V2X communication research organized by 3GPP, V2X communication methods based on sidelink(s) between User Equipment (UE) are part of the V2X standard, that is, service data is not forwarded by base station(s) and the core network, but is directly transmitted from the source UE to the target UE through an air interface (e.g., sidelink). FIG. 1 illustrates this type of V2X communication (generally referred to as PC5-based V2X communication or V2X sidelink communication), in accordance with various embodiments of the presently disclosed technology.

With the advancement of technology and development of the automation industry, V2X communication scenario can be further extended and can have higher performance requirements. Illustratively, advanced V2X services can be divided into four main categories: vehicle platooning, extended sensors, advanced driving (semi-automated or full-automated driving), and remote driving. The associated performance requirements can include: packet size supporting 50 to 12000 bytes, transmission rate at 2 to 50 messages per second, maximum end-to-end delay of 3 to 500 milliseconds, reliability of 90% to 99.999%, data rate at 0.5 to 1000 Mbps, and transmission range supporting 50 to 1000 meters.

Figure 2:
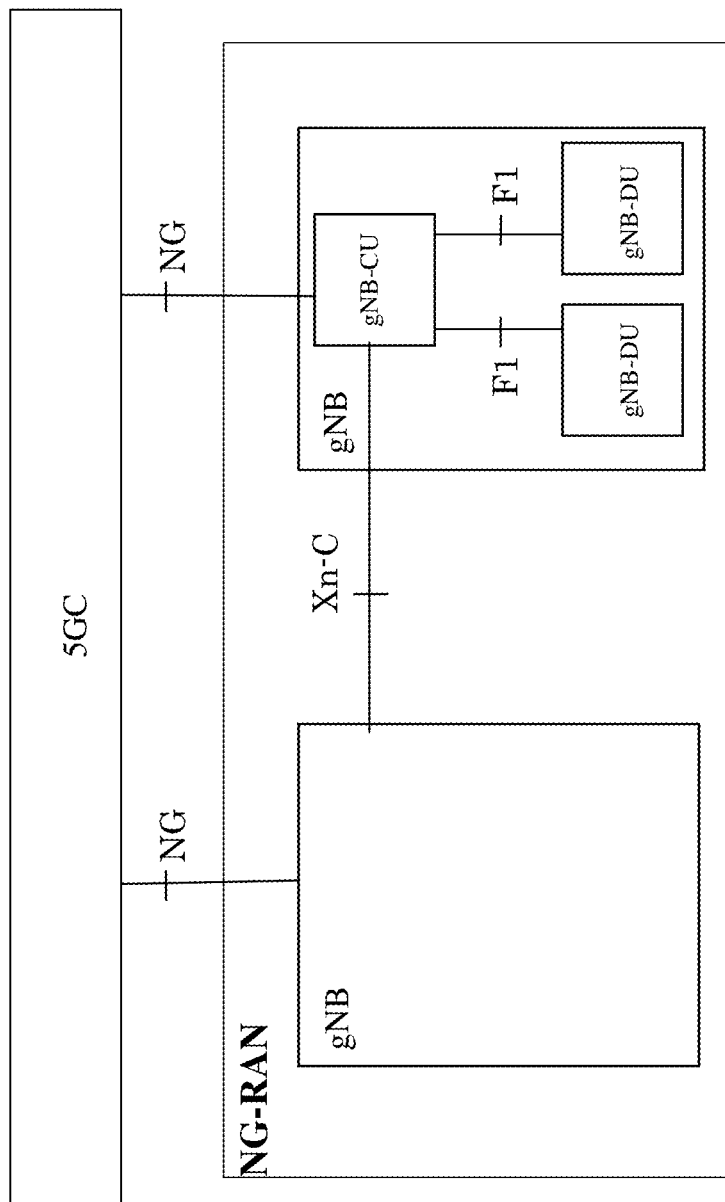
FIG. 2 shows an example of a general architecture of a 5G RAN.

FIG. 2 shows an example of a general architecture of a 5G RAN. On top of FIG. 2, the acronym 5GC refers to a core network of the 5G network. The bottom half of FIG. 2 shows a NG RAN, which is referred to as the 5G New Radio Access Technology (RAT) Radio Access Network. The NG-RAN consists of a set of one or more gNBs connected to the 5GC through the NG interface. The gNB is the base station of the 5G RAN. A gNB can support frequency division duplex (FDD) mode, time division duplex (TDD) mode, or dual connectivity mode operations. The set of gNBs can be interconnected through the Xn interface. A gNB can include a gNB-CU and one or more gNB-DU(s). A gNB-CU and a gNB-DU is connected via F1 interface. NG, Xn, and F1 are logical interfaces used in the network.

In the New Radio (NR) framework, the forward network interface can be divided by considering transmission capacity, transmission delay, and/or ease of deployment. For example, considering non-ideal forward transmission, the delay-insensitive network function can be placed on a network element such as in a Centralized Unit (CU) and a delay-sensitive network function can be placed on another network element, such as a Distributed Unit (DU).

In FIG. 2, the left gNB is not split into CU and DU, whereas the right gNB is split into CU and DU. The decision whether to split the gNB can be based on an operator's network deployment requirements. An example of the division of CU and DU functions in the protocol stack is that the CU can include Radio Resource Control (RRC), Service Data Adaptation Protocol (SDAP), and Packet Data Convergence Protocol (PDCP) functions and the DU can include RLC, MAC, and PHY functions.

Therefore, under the CU-DU separation architecture, some functions can be performed by the CU, some functions are performed by the DU, some functions require the CU and DU to cooperate, and the gNB-CU and the gNB-DU communicate through the F1 interface. Aspects of the presently disclosed technology are directed to mechanisms for obtaining V2X sidelink communication resources and performing V2X sidelink configuration for V2X sidelink communications under the gNB-CU/DU separation architecture.

Illustratively, an RRC idle/inactive UE can obtain, from V2X System Information Block (SIB), resource pool for sidelink communication transmission and reception, as well as other sidelink communication configurations, such as synchronization configuration, sensing configuration, Channel Busy Ratio (CBR) configuration, or the like. An RRC connected UE can obtain, from V2X SIB, resource pool for sidelink communication reception, and request sidelink communication transmission resource configurations from associated gNB-CU and/or DU, which perform(s) the configuration(s).

Illustratively, V2X sidelink communication resource configuration can include two modes. In accordance with mode 1, a base station performs scheduling, which can include (a) dynamic resources scheduling and (b) semi-static resource configuration for configured grant type 1 and/or configured grant type 2. In accordance with mode 2, a UE autonomously selects resources. For example, the UE can autonomous select resource(s) from the resource pool and/or resource set configured by an associated base station. In some embodiments, configured grant type 2 can be included with mode 2. The presently disclosed technology takes into account the separation and interaction between DU and CU for the different resource configuration modes, as well as the impact on the F1 interface signaling. Additionally, the V2X SIB obtaining, authorization verification, PC5 bearer configuration related procedures, and/or other related operations under the CU-DU separation architecture are addressed.

First Embodiment

Figure 3:
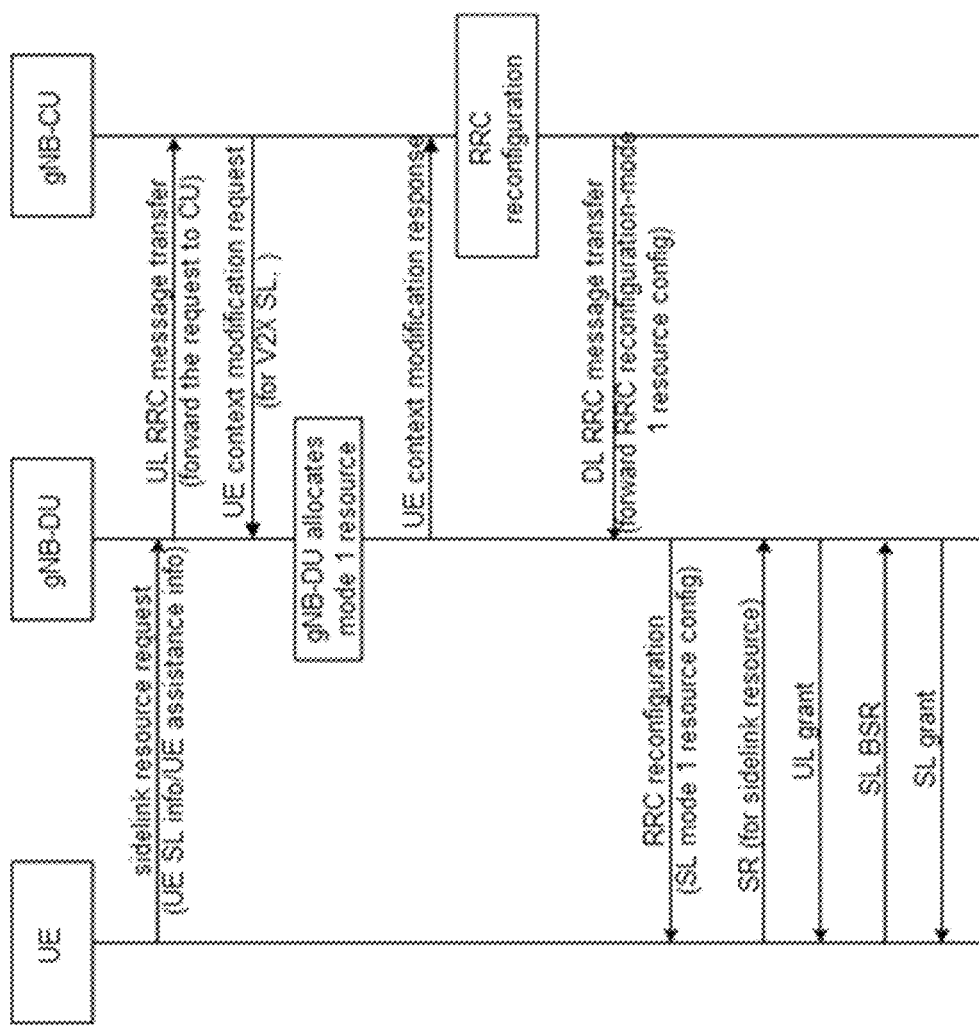
FIGS. 3-11 illustrates example communications between or among network elements for sidelink resource configuration, in accordance with various embodiments of the presently disclosed technology.
Figure 4:
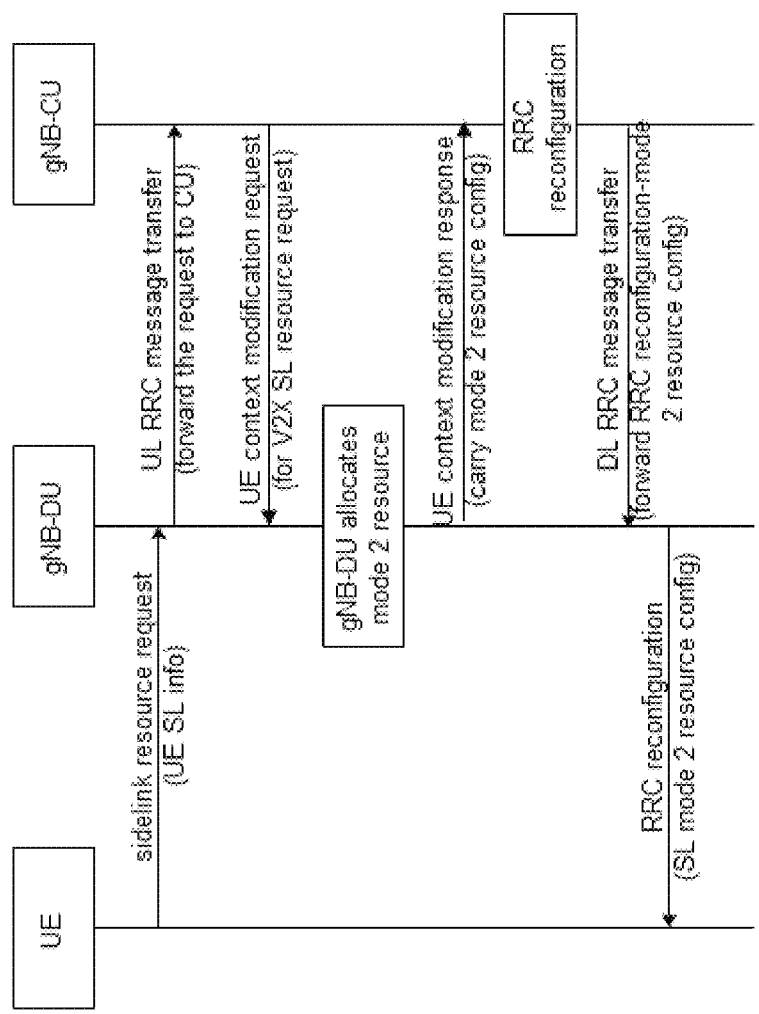

As shown in FIGS. 3 and 4, a UE sends a sidelink resource request to its associated gNB-DU. For example, the sidelink resource request can be a sidelink UE Information message or a UE Assistance Information message. The sidelink resource request can include at least one of the following information: service type, destination identity, frequency of interest, service QoS information (e.g., including PC5 QoS index list, QFI, priority level, reliability level, latency, communication range, 5QI, and/or VQI list), communication type (e.g., including unicast, groupcast, broadcast, and/or unicast in group), group leader, group member, group information (e.g., including number of group members, identifier of each group member, unicast UE pair in group, and/or unicast UE list), cross-RAT interest indication, mapping relationship between (a) service type and/or destination identity and (b) Tx profile (e.g., including transport format, protocol version information such as LTE/NR/R14/R15/R16, and/or other information), and/or traffic pattern (e.g., periodicity, packet size, timing offset, PC5 QoS index, priority level, and/or logical channel identity) corresponding to individual service type and/or destination identity.

After receiving the sidelink resource request, in some embodiments, the DU cannot directly identify or decode information contained by the sidelink resource request, and the DU forwards the sidelink resource request to an associated gNB-CU using F1 interface UL RRC message transfer. It should be noted that the DU may recognize msg 3 or UL-CCCH/DL-CCCH message (transmitted by SRB0, not yet encrypted and guaranteed), but may not be able to identify or decode an RRC message within the UL-DCCH/DL-DCCH message (transmitted through SRB1/2).

After receiving the sidelink resource request, the CU can perform authorization verification based on the UE's request and the authorization information in the UE context. For example, the CU can obtain V2X authorization information of the UE from core network element(s) such as the AMF, or from another base station, and save the authorization information into the UE context. If the authorization is successful, the CU can request the DU to allocate sidelink communication resource to the UE using the F1 interface UE context modification process or an F1 message defined for requesting sidelink resource configuration. For example, the CU can send to the DU a UE context modification request message, which can include CU to DU RRC Information that indicates the sidelink resource request information (or named UE sidelink information or other name). The sidelink resource request information sent by the CU in this manner can be recognized by the DU. The sidelink resource request information can include at least one of: mode 1 resource scheduling, configured grant type 2 scheduling, configured grant type 2 activation, configured grant type 2 deactivation, configured grant type 2 periodicity, mode 1 resource pool, Modulation and Coding Scheme (mcs), per destination duplication carrier sets, or mapping between (a) LCG and (b) PC5 QoS index, QFI, priority level, and/or reliability level.

After receiving the UE sidelink resource request information sent by the CU, the DU performs sidelink resource configuration, such as configuring LTE sidelink resources, mode 1 and/or mode 2 resources, and/or related parameters associated with various resource types.

For example, as shown in FIG. 3, if the DU allocates a mode 1 resource (e.g., a type of dynamically scheduled resource) to the UE, the configuration information can include at least one of the following: SL BWP configuration, SL-V-RNTI, scheduling resource pool information, mapping relationship(s) between (a) logical channel group (LCG) and/or logical channel (LCH) and (b) 5QI, VQI, priority, reliability, PDB, PER, PPPP, PPPR, QFI, and/or communication range, mcs configuration, and/or SR configuration (e.g., mapping relationship(s) between (a) LCG and/or LCH and (b) SR mapping, mapping between (a) SR and (b) 5QI, VQI, priority, reliability, PDB, PER, PPPP, PPPR, QFI, and/or communication range).

As another example, if the DU configures a configured grant type 1 resource for the UE, the resource configuration information can include at least one of the following: SL CG-config index, period, subcarrier spacing, subframe offset, time-frequency domain resource, mcs, mapping relationship(s) between (a) SL LCH and/or SL LCG and (b) CG-config index, and/or the CG-config index associated 5QI, VQI, priority, reliability, PDB, PER, PPPP, PPPR, QFI, and/or communication range.

As yet another example, if the DU configures a configured grant type 2 resource for the UE, the resource configuration information can include at least one of the following: allocated SL-CS-RNTI, period, CG-config index, subcarrier spacing, mcs, mapping relationship(s) between (a) SL LCH and/or SL LCG and (b) CG-config index, and/or the CG-config index associated 5QI, VQI, priority, reliability, PDB, PER, PPPP, PPPR, QFI, and/or communication range.

As a further example shown in FIG. 4, if the DU configures a mode 2 resource for the UE, the resource configuration information can include at least one of the following: mode 2 transmission resource pool(s) for unicast, mode 2 transmission resource pool(s) for groupcast, mode 2 transmission resource pool(s) for broadcast, and/or exceptional resource pool(s).

As shown in FIGS. 3 and 4, the resource configuration information generated for the UE can be sent by the DU to the CU using the F1 interface UE context modification response (e.g., DU to CU RRC Information), or using a newly defined F1 interface message and/or information element. The CU can then generate an RRC reconfiguration message for the UE, and include the above-mentioned sidelink resource configuration information. The CU can send the RRC reconfiguration message to the DU using the F1 interface DL RRC message transfer (e.g., an RRC container), and the DU can send the RRC reconfiguration message to the UE.

For the mode 1 dynamic scheduling resource configuration, the UE further sends SR/BSR to the DU, and the DU configures the SL grant, as shown in FIG. 3. For configured grant type 1 configuration, after the UE obtains the sidelink resource configuration information, the UE can use correspondingly configured resource(s). For configured grant type 2 configuration, the DU further indicates the activation/deactivation of specific resource location(s) and resource configuration(s) through PDCCH DCI.

For the mode 2 resource configuration, as shown in FIG. 4, after the UE obtains the sidelink resource configuration information, the UE can select resource(s) from the resource pool for sidelink communication, based on the mode 2 resource selection processing criterion.

It should be noted that in various embodiments, multiple configured grant type 1 and/or configured grant type 2 can be configured at the same time, substantially concurrently, or sequentially, and mode 1 and mode 2 resource configurations can be performed at the same time, substantially concurrently, or sequentially.

Second Embodiment

Figure 5:
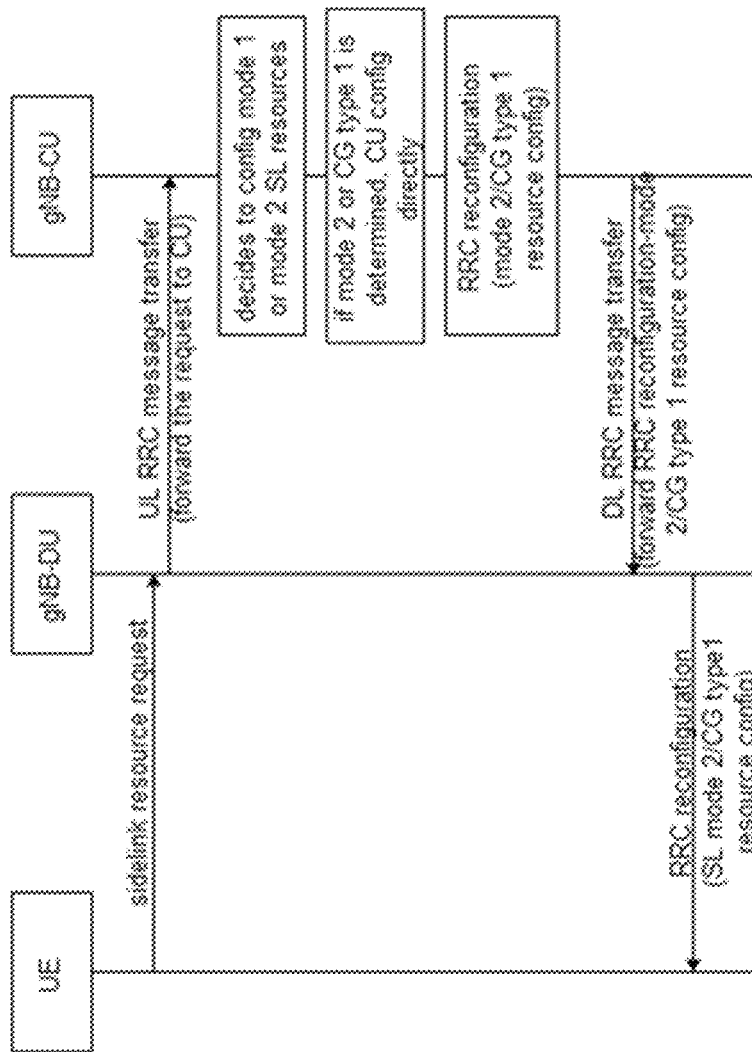

In accordance with the context of the first embodiment, because the CU can obtain V2X sidelink resource pool information from Operation Administration and Maintenance (OAM), and the CU can obtain mode 1 and mode 2 resource pool CBR measurement results through the sidelink measurement(s) reported by UE and thereby determine the usage of each resource pool if supported, the CU (instead of DU) can therefore make configuration decisions for mode 1 and/or mode 2 resources. If the CU decides to configure mode 2 and/or mode 1 configured grant type 1 resource(s), the CU can directly perform related resource and/or resource pool configuration without communicating with the DU, and then send the RRC reconfiguration message (via the DU) to the UE, as shown in FIG. 5. As compared with the first embodiment, this approach can reduce F1 signaling interactions.

Figure 6:
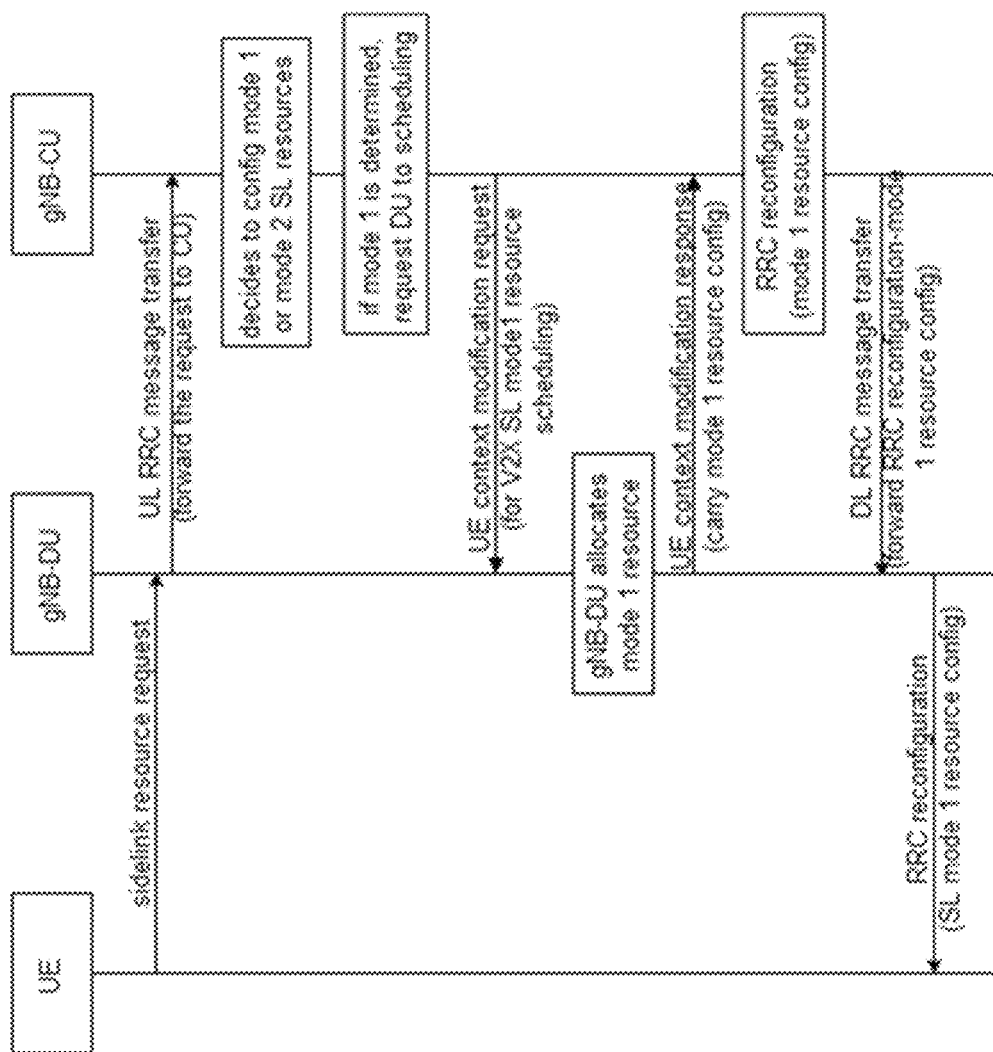

As shown in FIG. 6, if the CU decides to configure mode 1 dynamic scheduling resource and/or configured grant type 2 resource, the CU can further request the DU to perform resource scheduling through the F1 interface. Similar to the first embodiment, the CU can send the sidelink resource request information to the DU via the F1 message, and the DU can then perform resource configuration (e.g., for mode 1). The resulting resource configuration information can then be sent from the DU to the CU (e.g., in the UE context modification response), and the CU generates an RRC reconfiguration message and sends it (e.g., via the DU) to the UE. Alternatively, the CU can send mode 1 resource pool configuration information or configured grant type 2 indication to the DU, and the DU can configure or activate/deactivate SL grant for the UE. In this case, the sidelink information CU sent to DU may include at least one of: mode 1 resource scheduling, configured grant type 2 scheduling or activation and/or deactivation, configured grant type 2 periodicity, mode 1 resource pool, Modulation and Coding Scheme (mcs), mapping between logical channel group (LCG) and PC5 QoS index/QFI/priority level/reliability level, or per destination duplication carrier sets.

Third Embodiment

In the accordance with the context of the first and second embodiments, the gNB-DU can obtain the UE V2X authorization information from the gNB-CU through the F1 interface UE context establishment/modification process and save the authorization information in the UE context. As described above, the CU can obtain the V2X authorization information of the UE from core network element(s) such as the AMF or from other base station, and save the information in the UE context. Also as described above, after the DU initially receives the sidelink resource request sent by the UE, the DU forwards the request to the CU because the DU may not be capable of decoding the UL-DCCH message. Therefore, after the CU receives the sidelink resource request, the CU can perform authorization verification on the UE. If the authentication is successful, the CU requests the DU, via the F1 interface, to configure sidelink resource for the UE or the CU performs sidelink resource configuring for the UE, as described in the first embodiment and the second embodiment, respectively.

Figure 7:
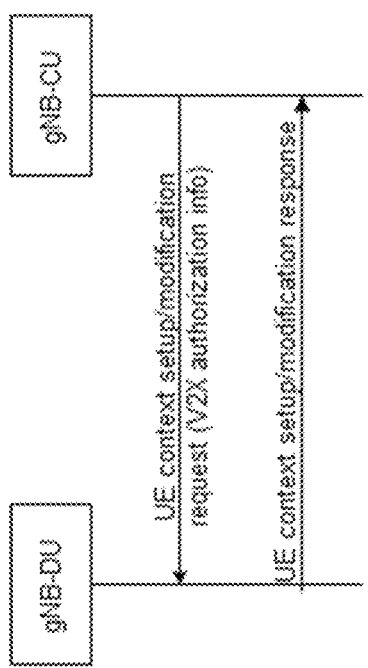

If the sidelink resource configuration is performed by the DU, the CU may not have information on whether the DU can schedule and/or configure LTE sidelink resource; or, the UE may not indicate any request for LTE/NR SL resource in its sidelink resource request, instead, the UE indicates the request for LTE/NR SL resource via SL BSR. In this case and in other applicable situations, the DU (instead of the CU) can perform authorization verification on the UE using the UE V2X authorization information obtained from the CU through the F1 interface (e.g., as part of the UE context establishment/modification process), as shown in FIG. 7. If the verification succeeds, the DU can schedule the corresponding LTE/NR SL resource for the UE. Illustratively, the V2X authorization information can include at least one of the following: vehicle UE, pedestrian UE, sidelink discovery authorization, sidelink communication authorization, LTE sidelink communication authorization, NR sidelink communication authorization, sidelink cross-RAT authorization, NR sidelink unicast authorization, NR sidelink broadcast authorization, NR sidelink multicast authorization, authorization-supported service types (e.g., platooning, automated driving, remote driving, a specific V2X service, destination L2 ID list, or the like), authorization-supported service roles (e.g., platooning/group leader UE, automated UE, remote driving UE, or the like), authorization-supported service automation level(s) (e.g., automation level 0~5 or other level representation).

Fourth Embodiment

This embodiment addresses process(es) for communicating PC5 QoS information, sidelink communication assistance configuration information, and/or sidelink bearer configuration information between the CU and DU.

Figure 8:
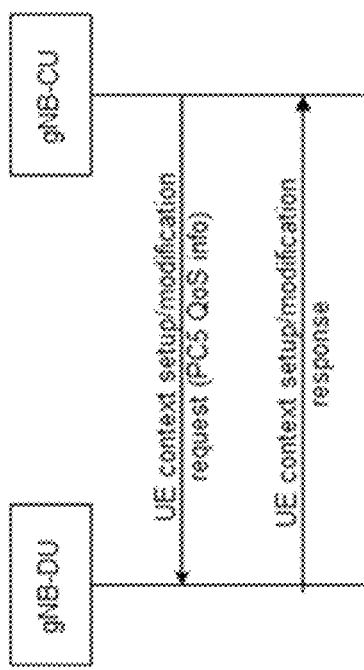

As shown in FIG. 8, the DU can obtain the UE PC5 QoS information from the gNB-CU through the F1 interface UE context establishment/modification process and save the QoS information in the UE context. The CU can obtain the PC5 QoS information of the UE from core network element(s) such as the AMF or from other base station, and save the QoS information in the UE context. The CU and/or DU can use the PC5 QoS information as a basis for performing sidelink resource configuration and/or sidelink bearer configuration to meet PC5 QoS requirements. The PC5 QoS information can include at least one of the following: (a) UE PC5 AMBR, (b) per PC5 QoS flow MFBR, GFBR and/or ARP, or (c) service QoS information (e.g., PC5 QoS index/QFI/priority level/reliability level/latency/communication range).

The CU and/or DU can send sidelink communication assistance configuration information via the V2X SIB, specifically, in at least two ways: 1) During the F1 interface establishment process, the DU determines the sidelink communication assistance configuration information, sends it to CU using an F1 setup request message (e.g., served cell info or a newly defined information element), and the CU generates encoded V2X SIB (including the sidelink communication assistance configuration information); or 2) The CU determines the sidelink communication assistance configuration information and includes it in the V2X SIB, and then sends to the DU during the F1 interface setup/establishment process. The sidelink communication assistance configuration information can include at least one of the following: mapping relationship(s) between (a) PDB, latency, VQI, and/or priority level and (b) maximum PSSCH duration and/or subcarrier space (SCS), threshold(s) of priority level and/or PDB used to determine which priority level(s) can use configured grant type 1, type 2, mode 1, and/or mode 2 resource(s), threshold(s) of PER and/or reliability level used to determine which reliability level can trigger RLC AM and/or PDCP duplication, and/or mapping relationship(s) between (a) LCG and (b) priority level and/or reliability level. As will be described in detail below with the fifth embodiments, the UE can obtain the V2X SIB.

Figure 9:
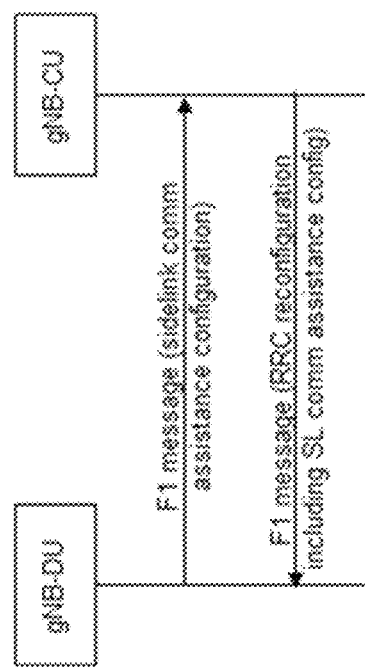

Alternatively or in addition, the gNB-CU and/or DU can send the sidelink communication assistance configuration information to the UE by using RRC dedicated signaling, specifically, in at least two ways: 1) when the DU receives the sidelink resource request information from the CU, it determines the type(s) of resource(s) to configure for the UE. At the same time or substantially concurrently, the DU can configure sidelink communication assistance configuration information for the UE (to enable the UE to autonomously establish a sidelink logical channel and map the V2X data packet to the corresponding sidelink logical channel for transmission), and send it to the CU. The CU generates an RRC reconfiguration message, and further sends the message to the UE via the DU, as shown in FIG. 9. Here, the F1 message can be an existing F1 interface message, or a newly defined F1 message and/or message element dedicated to sending sidelink related configuration information. This process is otherwise similar to that in the first embodiment; or 2) when the CU receives the sidelink resource request, it determines the type(s) of resource(s) to configure for the UE, and at the same time or substantially concurrently, the CU configures the sidelink communication assistance configuration information for the UE, and includes it in the RRC reconfiguration message. This process is otherwise similar to that of the second embodiment.

After receiving the sidelink communication assistance configuration information configured by the gNB-DU and/or CU, the UE establishes a sidelink logical channel and associates it with the LCG. For QoS data flows corresponding to different maximum PSSCH duration, SCS, priority level, whether triggering RLC AM, and/or other factors, different logical channels can be established; QoS flows corresponding to the same feature(s) described above can be mapped to the same logical channel. The UE can match the QoS information corresponding to the PC5 QoS flow to the corresponding maximum PSSCH duration, SCS, available resource type (e.g., configured type 1/type 2, dynamic/mode 1, mode 2, or the like), RLC AM, PDCP duplication, etc., and map the PC5 QoS flow to the corresponding sidelink logical channel to perform transmission.

With this type of transmission, when the UE reports the traditional SL BSR, the base station may only be able to detect the buffer size corresponding to different priorities, and may not be able to use LCGID to detect the SCS, the maximum PSSCH duration, and/or the like corresponding to the resource(s) as required by the UE. To address these issues, the presently disclosed technology can include: 1) adding the SCS and/or maximum PSSCH duration indication in the SL BSR; 2) adding the mapping relationship between (a) the LCGID and (b) the SCS and/or the maximum PSSCH duration; 3) for a connected UE, the associated base station configures, for each destination ID, the mapping relationship(s) between the LCG and the QoS index, the SCS corresponding to each LCG, the maximum PSSCH duration, and/or the type of resources that can be used.

In addition, the gNB-CU and/or DU can configure sidelink bearer configuration information and/or SL logical channel for the UE, in a way similar to the Uu interface. The configuration can include: mapping relationship(s) between (a) the QoS index, VQI, 5QI, and/or QFI and (b) the SL logical channel, the logical channel group to which it belongs, the SCS corresponding to each SL logical channel, the maximum PSSCH duration, whether the configured grant type 1/configured grant type 2/mode 1 is allowed, whether data duplication is required, and/or the carrier sets corresponding to data duplication. Illustratively, when there is a new PC5 QoS flow transmission, the UE can send QFI (or PC5 QoS flow profile/parameters) to the CU, and the CU configures mapping relationship(s) between the PC5 QoS flow and the SL RB, or establishes a new SL RB to transmit the PC5 QoS flow. The CU configures the SL RB (e.g., SDAP, PDCP configuration), and the CU sends such configuration information (and the PC5 QoS flow profile/ parameters, SL RB QoS) to the DU (e.g., using the F1 UE context setup/modification process). The DU determines whether to accept the configuration according to resource status. If the DU accepts, the corresponding RLC/LCH/ MAC parameters are configured and sent to the CU, and the CU generates an RRC reconfiguration message, which is sent to the UE via the DU.

Fifth Embodiment

This embodiment describes how the UE obtains V2X SIB message(s) under the CU/DU separation architecture, thereby obtaining V2X sidelink transmission/reception resource pool(s) and/or sidelink related configuration(s).

Figure 10A:
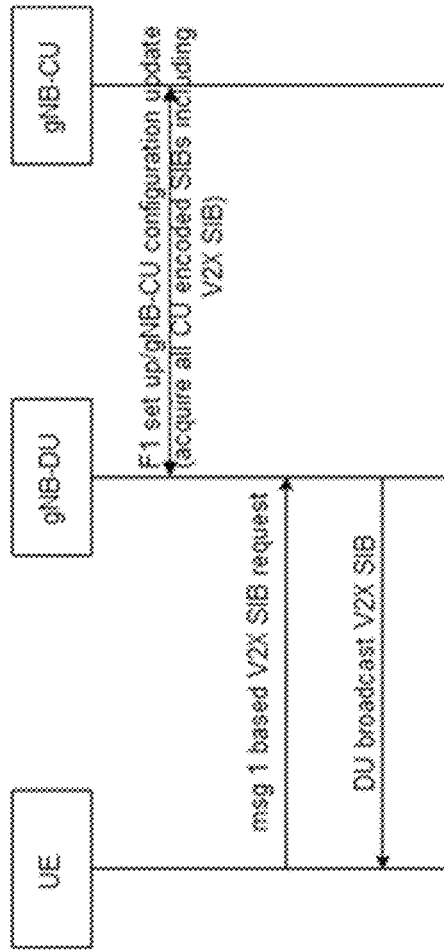
Figure 10B:
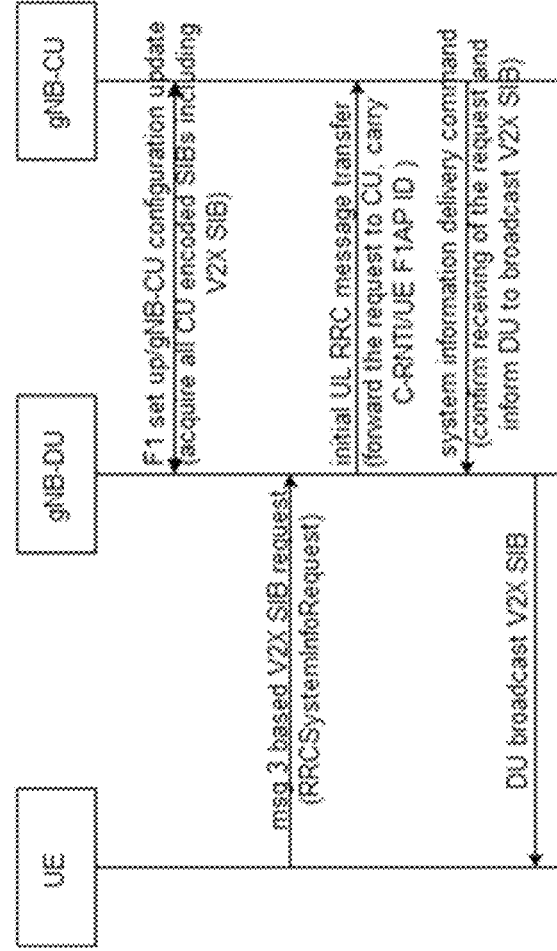

As shown in FIGS. 10A and 10B, in accordance with the functional separation between gNB-CU and DU under the NR standard, the DU performs scheduling of broadcast messages and transmits broadcast messages based on scheduling parameters. The DU is responsible for the MIB and SIB1 encoding; the CU is responsible for the encoding of the other SI (except MIB and SIB1), and instructs the DU to broadcast the requested SIB through the System Information Delivery command. Specifically, in the F1 interface establishment process, the DU sends the encoded MIB and the SIB1 to the CU through an F1 setup request message. The CU sends the encoded other SIBs (except MIB and SIB1) to the DU through an F1 setup response message. If the system message changes, the DU can update its configuration to the CU through gNB-DU configuration update message(s) (e.g., updated MIB and/or SIB1). The CU can update its configuration to the DU through gNB-CU configuration update (e.g., updated other SIBs).

If the other SIB s (except MIB and SIB1) are not sent by broadcast: for msg 1 based SI Request (e.g., configured with the requesting SI's PRACH resource), the DU sends an ACK (e.g., via msg2 MAC CE) and broadcasts the requested SIB (e.g., all SIBs already obtained via the F1 establishment process and/or the CU configuration update); for msg 3 based SI Request (e.g., not configured with any requesting SI's resource), after receiving the RRCSystemInfoRequest, the DU forwards it to the CU using the Initial UL RRC Message Transfer. After receiving the RRCSystemInfoRequest, the CU indicates in the SYSTEM INFORMATION DELIVERY COMMAND message which SIB(s) (e.g., via SIType list, which is the SIBs requested in RRCSystemInfoRequest) that the DU will broadcast. After the DU receives it, the DU sends an ACK (e.g., MSG4) to the UE and broadcasts the requested SIB.

For gNB-CU/DUs that support V2X communication, the CU will send the encoded V2X SIB (and/or all other SIBs) to the DU when the F1 interface is set up/established and/or via CU configuration update. For an RRC idle/inactive UE, if no V2X SIB is received, the UE may use the dedicated SI RACH resource (e.g., msg 1 based, if configured) to request the V2X SIB, and the gNB-DU broadcasts the V2X SIB upon receiving the request; or, the UE can use msg 3 based on-demand SI request (e.g., RRC SystemInfoRequest) to indicate V2X SIB index and/or V2X sidelink communication purpose, in order to request the V2X SIB. After receiving the V2X SI Request, the gNB-DU forwards the V2X SI Request to the gNB-CU through the F1-initial UL RRC message. The gNB-CU uses the SYSTEM INFORMATION DELIVERY COMMAND to indicate V2X SIB(s) for the DU to broadcast, and the gNB-DU broadcasts the V2X SIB after receiving the message.

Figure 11:
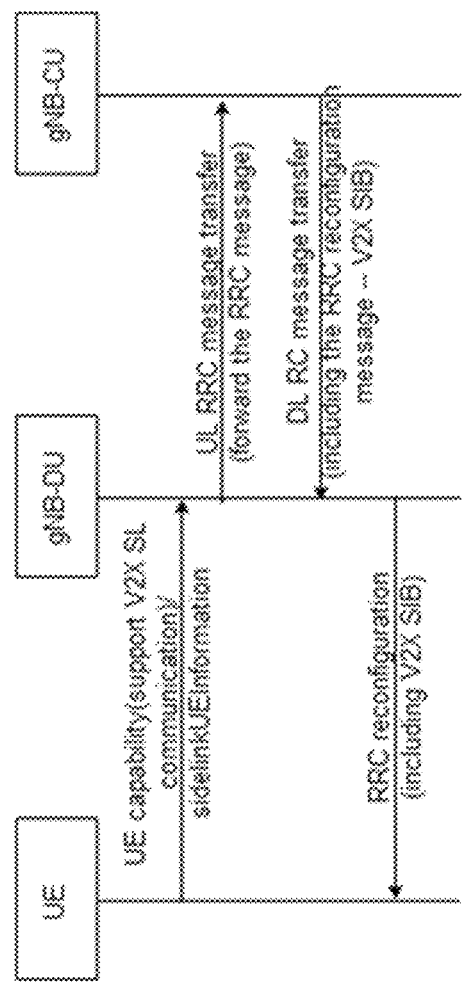

As shown in FIG. 11, for an RRC connected UE, if the V2X SIB is not sent in the broadcast message (or if the UE is not configured with the common search space), the UE can indicate whether it supports V2X sidelink communication in the UE capability information it sends to the gNB-CU/DU. If V2X sidelink communication is supported, the gNB-CU can use RRC dedicated signaling (e.g., an RRC reconfiguration message) to send the V2X SIB (and/or other SIBs) to UE. Alternatively or in addition, after the gNB-CU receives the sidelinkUEInformation message sent by the UE, the gNB-CU sends the V2X SIB to the UE using RRC dedicated signaling (e.g., an RRC reconfiguration message).

Sixth Embodiment

This embodiment addresses OAM management in the CU-DU separation architecture. Illustratively, the OAM can simultaneously manage the CU and the DU. In other words, the CU/DU has an interface with the OAM, and all the cell parameters of the DU are configured by the OAM. For V2X, the DU is responsible for sidelink resource allocation, and the CU is responsible for V2X SIB encoding. The CU/DU can obtain the V2X sidelink communication resource pool(s) using at least one of the following three ways:

1) The CU/DU can obtain the V2X resource pool from the OAM. The DU only obtains the V2X resource pool(s) of the cell(s) it served, and the CU can obtain the V2X resource pool(s) of multiple DU/cells. Alternatively, the V2X resource pool information obtained is the same for both the DU and the CU, which can include the V2X resource pool information of the current cell and neighboring cell(s).

2) The OAM configures the V2X resource pool(s) for the CU. During the F1 interface setup and/or CU configuration update process, the CU sends all SIBs (including V2X SIB(s)) encoded by the CU to the DU, so that the DU can obtain the V2X resource pool information from the V2X SIB(s). Alternatively, the CU sends V2X resource pool information to the DU through a newly defined message element of the F1 interface. The V2X sidelink resource pool configuration includes at least one of SL BWP, reception resource pools, V2X transmission resource pool, P2X transmission resource pool, unicast/groupcast/broadcast transmission resource pool, exceptional resource pool, inter-frequency resource pools, synchronization configuration, resource selection configuration, zone configuration, threshold for sidelink transmission prioritization, anchor carrier list, CBR configuration, or PDCP duplication configuration.

3) The OAM configures the V2X resource pool(s) for the DU, and the DU sends the V2X resource pool information to the CU using the F1 setup/establishment process (or using other message(s) and/or defined message element(s) via the F1 interface).

Figure 12:
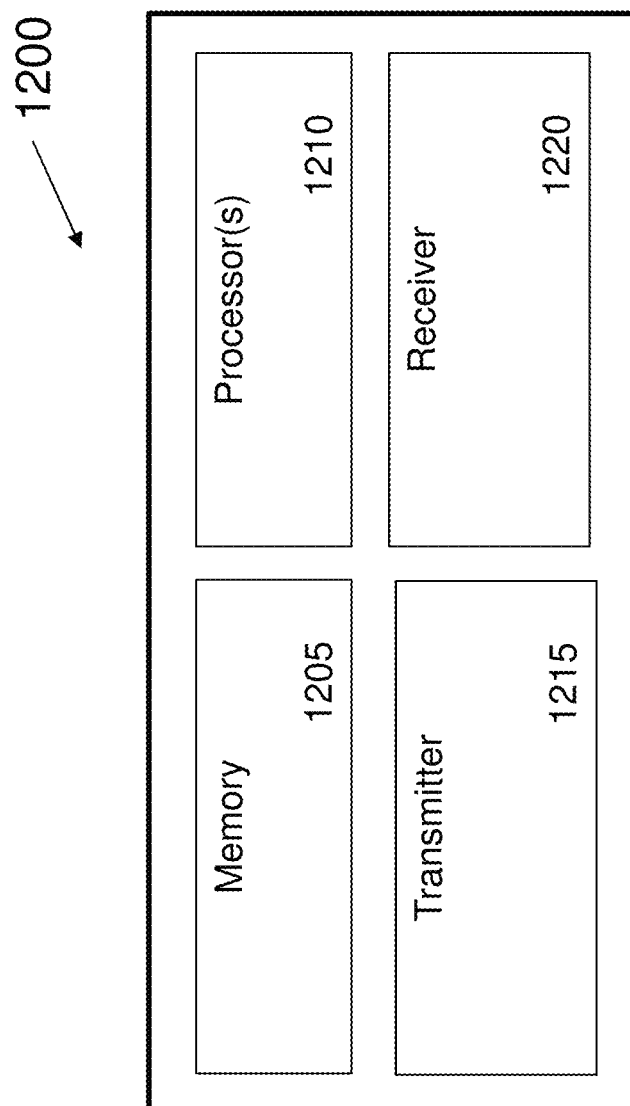
FIG. 12 shows an exemplary block diagram of a communication node or a network node.

FIG. 12 shows an exemplary block diagram of a communication node or a network node 1200. The communication node 1200 can include a user equipment (UE), a mobile device, or a multimedia gateway. The network node 1200 can include a base station, a RAN node, a gNB, a master node in a dual-connectivity system, a secondary node in a dual-connectivity system, or a network element such as a distributed unit (DU) or a centralized unit (CU). The communication or network node 1200 includes at least one processor 1210 and a memory 1205 having instructions stored thereupon. The instructions upon execution by the processor 1210 configure the communication or network node 1200 to perform the operations in the various embodiments described in this patent document. The transmitter 1215 transmits or sends information or data to another network node or another communication node. The receiver 1220 receives information or data transmitted or sent by another network node or another communication node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
 receiving, by a base station distributed unit (DU), a User Equipment (UE) context modification request from a base station centralized unit (CU) via an F1 interface, wherein the UE context modification request comprises CU to DU Radio Resource Control (RRC) information that includes information related to a UE, the information related to the UE comprising (1) UE assistance information, or (2) sidelink information that includes at least one of a destination identity, a frequency of interest, service Quality of Service (QoS) information, or a communication type; and
 transmitting, from the base station DU to the base station CU, a UE context modification response via the F1 interface, wherein the UE context modification response includes DU to CU RRC information indicating sidelink resource configuration for the UE,
 wherein prior to receiving the UE context modification request:
  receiving, by the base station DU from the base station CU, a UE context setup request that includes PC5 Quality of Service (QoS) information and CU part sidelink bearer configuration; and
  transmitting, from the base station DU to the base station CU, a UE context setup response indicating DU part sidelink bearer configuration.

2. The method of claim 1, wherein the UE context modification request includes V2X authorization information regarding the UE.

3. The method of claim 2, wherein the V2X authorization information comprises at least one of a Long-Term Evolution (LTE) authorization information or a New Radio (NR) authorization information.

4. The method of claim 2, wherein the V2X authorization information includes at least one of vehicle UE or pedestrian UE.

5. The method of claim 1, wherein the PC5 QoS information includes at least one of UE PC5 AMBR, per PC5 QoS flow MFBR, per PC5 QoS flow GFBR, or service QoS information.

6. The method of claim 1, wherein the CU part sidelink bearer configuration includes a mapping between a QoS flow and a sidelink radio bearer (SLRB).

7. The method of claim 1, wherein the UE context setup request includes V2X authorization information regarding the UE.

8. The method of claim 7, wherein the V2X authorization information comprises at least one of a Long-Term Evolution (LTE) authorization information or a New Radio (NR) authorization information.

9. The method of claim 7, wherein the V2X authorization information includes at least one of vehicle UE or pedestrian UE.

10. A device implemented as a base station distributed unit (DU) for wireless communication, wherein the device comprises a processor that is configured to:
receive a User Equipment (UE) context modification request from a base station centralized unit(CU) via an F1 interface, wherein the UE context modification request comprises CU to DU Radio Resource Control (RRC) information that includes information related to a UE, the information related to the UE comprising (1) UE assistance information, or (2) sidelink information that includes at least one of a destination identity, a frequency of interest, service Quality of Service (QoS) information, or a communication type; and
transmit, to the base station CU, a UE context modification response via the F1 interface, wherein the UE context modification response includes DU to CU RRC information indicating sidelink resource configuration for the UE,
wherein prior to receiving the UE context modification request, the processor is further configured to:
receive, from the base station CU, a UE context setup request that includes PC5 Quality of Service (QoS) information and CU part sidelink bearer configuration; and
transmit, to the base station CU, a UE context setup response indicating DU part sidelink bearer configuration.

11. The device of claim 10, wherein the UE context modification request includes V2X authorization information regarding the UE.

12. The device of claim 11, wherein the V2X authorization information comprises at least one of a Long-Term Evolution (LTE) authorization information or a New Radio (NR) authorization information.

13. The device of claim 11, wherein the V2X authorization information includes at least one of vehicle UE or pedestrian UE.

14. The device of claim 10, wherein the PC5 QoS information includes at least one of UE PC5 AMBR, per PC5 QoS flow MFBR, per PC5 QoS flow GFBR, or service QoS information.

15. The device of claim 10, wherein the CU part sidelink bearer configuration includes a mapping between a QoS flow and a sidelink radio bearer (SLRB).

16. The device of claim 10, wherein the UE context setup request includes V2X authorization information regarding the UE.

17. The device of claim 16, wherein the V2X authorization information comprises at least one of a Long-Term Evolution (LTE) authorization information or a New Radio (NR) authorization information.

18. The device of claim 16, wherein the V2X authorization information includes at least one of vehicle UE or pedestrian UE.

19. A non-transitory computer readable program storage medium having code stored thereon, the code, when executed by a processor, causing the processor to implement a method, comprising:
receiving, by a base station distributed unit (DU), a User Equipment (UE) context modification request from a base station centralized unit (CU) via an F1 interface, wherein the UE context modification request comprises CU to DU Radio Resource Control (RRC) information that includes information related to a UE, the information related to the UE comprising (1) UE assistance information, or (2) sidelink information that includes at least one of a destination identity, a frequency of interest, service Quality of Service (QoS) information, or a communication type; and
transmitting, from the base station DU to the base station CU, a UE context modification response via the F1 interface, wherein the UE context modification response includes DU to CU RRC information indicating sidelink resource configuration for the UE,
wherein prior to receiving the UE context modification request:
receiving, by the base station DU from the base station CU, a UE context setup request that includes PC5 Quality of Service (QoS) information and CU part sidelink bearer configuration; and
transmitting, from the base station DU to the base station CU, a UE context setup response indicating DU part sidelink bearer configuration.

20. The non-transitory computer readable program storage medium of claim 19, wherein the CU part sidelink bearer configuration includes a mapping between a QoS flow and a sidelink radio bearer (SLRB).

* * * * *